US012639996B2

(12) United States Patent
Orlando et al.

(10) Patent No.: US 12,639,996 B2
(45) Date of Patent: May 26, 2026

(54) DEVICE AND SYSTEM FOR MONITORING THE TRANSIT THROUGH PASSAGES

(71) Applicant: UBIQUICOM S.R.L., Milan (IT)

(72) Inventors: Michele Orlando, Milan (IT); Stefano Sarasso, Milan (IT)

(73) Assignee: UBIQUICOM S.R.L., Milan (IT)

( * ) Notice: Subject to any disclaimer, the term of this patent is extended or adjusted under 35 U.S.C. 154(b) by 240 days.

(21) Appl. No.: 18/016,029

(22) PCT Filed: Jul. 13, 2021

(86) PCT No.: PCT/IB2021/056287
§ 371 (c)(1),
(2) Date: Jan. 13, 2023

(87) PCT Pub. No.: WO2022/013733
PCT Pub. Date: Jan. 20, 2022

(65) Prior Publication Data
US 2023/0298415 A1     Sep. 21, 2023

(30) Foreign Application Priority Data

Jul. 13, 2020     (IT) ........................ 102020000016879

(51) Int. Cl.
*G07C 9/15*          (2020.01)
*G01S 5/02*          (2010.01)
(Continued)

(52) U.S. Cl.
CPC .............. *G07C 9/15* (2020.01); *G01S 5/0295* (2020.05); *G07B 15/063* (2013.01);
(Continued)

(58) Field of Classification Search
CPC ........ G07C 9/15; G07C 9/00309; G07C 9/28; G01S 5/0295
See application file for complete search history.

(56) References Cited

U.S. PATENT DOCUMENTS 10,134,210 B1     11/2018  Gravelle et al.
10,163,178 B1     12/2018  Sprogis et al.
(Continued)

OTHER PUBLICATIONS

Internal Search Report and Written Opinion received for PCT Application No. PCT/IB2021/056287, mailed on Nov. 3, 2021, 11 pages.

*Primary Examiner* — Nabil H Syed
(74) *Attorney, Agent, or Firm* — Gearhart Law LLC

(57)     ABSTRACT

The present invention relates to a device (2) for monitoring the transit of a user or of a land vehicle through a passage (or opening, or considerable area, hereinafter referred to cumulatively as "passage" for brevity's sake), comprising: a receiver-transmitter (5) of short-range radio signals configured to: transmit data indicative of a unique recognition code of the passage (ID_2); receive data indicative of a confirmation of receipt of a unique recognition code (ID_1) and indicative of an identifier of a user present inside the set cover angle (3); a processing unit (20) configured to:
  a) receive a first presence detecting signal (S1) having a value that is indicative of the presence of the user and of the vehicle inside the set cover angle (3) and generate, as a function of the value of the first presence detecting signal (S1), a second signal (S2) that carries data indicative of said unique recognition code (ID_1);
  b) calculate, with great precision, at set intervals of time (ti), the distance (di) and the angle (αi) with respect to a fixed directrix of said set orientation of the device;
  c) determine the trajectory (TRJ) of the user or vehicle approaching the passage on the basis of a time sequence of calculated distances (di) and angles (αi);
  d) if said trajectory (TRJ) is within the activation area (4) of the passage and approaches the passage, generate a
(Continued)

command signal (S3) to open the passage and enable the user or the land vehicle to pass through.
The invention also relates to a system (1) for monitoring the transit of a user or of a land vehicle through a passage.

16 Claims, 4 Drawing Sheets

(51) Int. Cl.
| | | |
|---|---|---|
| *G07B 15/06* | (2011.01) | |
| *G07C 9/00* | (2020.01) | |
| *G07C 9/28* | (2020.01) | |
| *G07C 9/29* | (2020.01) | |

(52) U.S. Cl.
CPC ........... *G07C 9/00309* (2013.01); *G07C 9/28* (2020.01); *G07C 9/29* (2020.01); *G07C 2009/00793* (2013.01); *G07C 2209/63* (2013.01)

(56) References Cited

U.S. PATENT DOCUMENTS

| | | | |
|---|---|---|---|
| 2009/0101709 | A1 | 4/2009 | Nonaka |
| 2021/0358237 | A1* | 11/2021 | Miller ................ G07C 9/00571 |

* cited by examiner

1

2

10

ID_1,S1

5

S1,S2

ID_2,S2

20

30

ID_1;ID_2;

S3,S4,S5

S3,TRJ

2

2

10 d

α

10

PWR

α

DEVICE AND SYSTEM FOR MONITORING THE TRANSIT THROUGH PASSAGES

The present application is a U.S. national phase application of a PCT Application No. PCT/IB2021/056287 filed on Jul. 13, 2021, which claims a priority to Italian Patent Application No. 102020000016879 filed in Italy on Jul. 13, 2020 a disclosure of which are incorporated in their entireties by reference herein.

TECHNICAL FIELD

The present invention relates to a device and a system for monitoring the transit of users or land vehicles through a passage (or opening, or considerable area, hereinafter referred to cumulatively as "passage" for brevity's sake).

In particular, the present invention finds application in monitoring the transit through a single passage, through a plurality of passages, such as turnstiles for access to an underground station, for access and collection or deposit of parts inside a factory. Further applications of the present invention relate to the payment of services, such as, for example, the delivery of fuel in a service station or the payment of the ride in the underground, based on the transit through the passage of an entrance station and that of an exit station.

Prior Art

The use of automated passages is known, comprising sensors capable of detecting the presence of a user or a vehicle approaching at a very short distance.

Passages are known whose access is monitored and controlled by a badge in the possession of the user, which must be placed on a special reader arranged near the passage itself.

There are also known devices for monitoring through passages, which use the radio transmission of signals, for example, using RFID, NFC or Bluetooth technology.

These known devices for monitoring the transit through passages require the user to be very close to the passage itself.

Furthermore, the use of known devices based, for example, on RFID, NFC or Bluetooth technologies, do not have an accuracy such as to guarantee high precision.

Furthermore, these known devices do not allow, in the presence of several users or land vehicles approaching the passage, to detect which of these users is actually about to pass through the passage and which, on the other hand, passes near it, without having to cross it.

The aim of the present invention is to provide a device and a system for monitoring the transit through passages which solves the problems highlighted.

The specific object of the present invention is to provide a device and a system for monitoring the transit through passages that is precise and reliable in determining the intention of a user or a land vehicle to cross a passage, even in the presence of a plurality of users or land vehicles near the passage.

A further aim of the present invention is that of providing an efficient device and system for monitoring transit through passages.

OBJECT OF THE INVENTION

In a first aspect of the invention, the above-mentioned aims are achieved by a device for monitoring the transit of a user or a land vehicle through a passage according to that which is disclosed in claim 1.

Advantageous aspects are described in dependent claims 2 to 9.

In a second aspect of the invention, the above-mentioned aims are achieved by a system for monitoring the transit of a user or a land vehicle through a passage according to that which is disclosed in claim 10. Advantageous aspects are disclosed in dependent claims from 11 to 16. The Applicant has noted that the system for monitoring the transit of a passage in accordance with the present invention has the following advantages:

it allows a precise location of a user or a land vehicle approaching the passage;

it allows to accurately and reliably trace the trajectory of a user or a land vehicle approaching the passage;

it allows to clearly and surely identify the intention of a user in wanting to communicate the decision to pass through the passage, even in the presence of a large number of users or land vehicles moving near the passage;

it allows to combine the transit through a passage with a charge for a service provided;

it allows an increase in safety in the transit of users or land vehicles through a passage;

it allows the recognition of the intention of a user or whoever is driving a land vehicle to cross a passage or a specific area without requiring said user or whoever is driving the vehicle to perform particular actions or extract or present any recognition or authorisation device ("hands-free" passage);

it allows the recognition of the intention of a user or whoever is driving a land vehicle to pay for a given service or product without requiring said user or whoever is driving the vehicle to perform particular actions or extract or present any recognition or authorisation device ("hands-free" payment).

The technical effects/advantages mentioned, and other technical effects/advantages of the invention, will emerge in further detail from the description provided herein below of an example embodiment provided by way of approximate and non-limiting example with reference to the appended drawings.

BRIEF DESCRIPTION OF THE DRAWINGS

Additional features and advantages of the invention will become more apparent from the description which follows of a preferred embodiment and the variants thereof, provided by way of example with reference to the appended drawings, in which.

DETAILED DESCRIPTION OF PREFERRED EMBODIMENTS OF THE INVENTION

Figure 1:
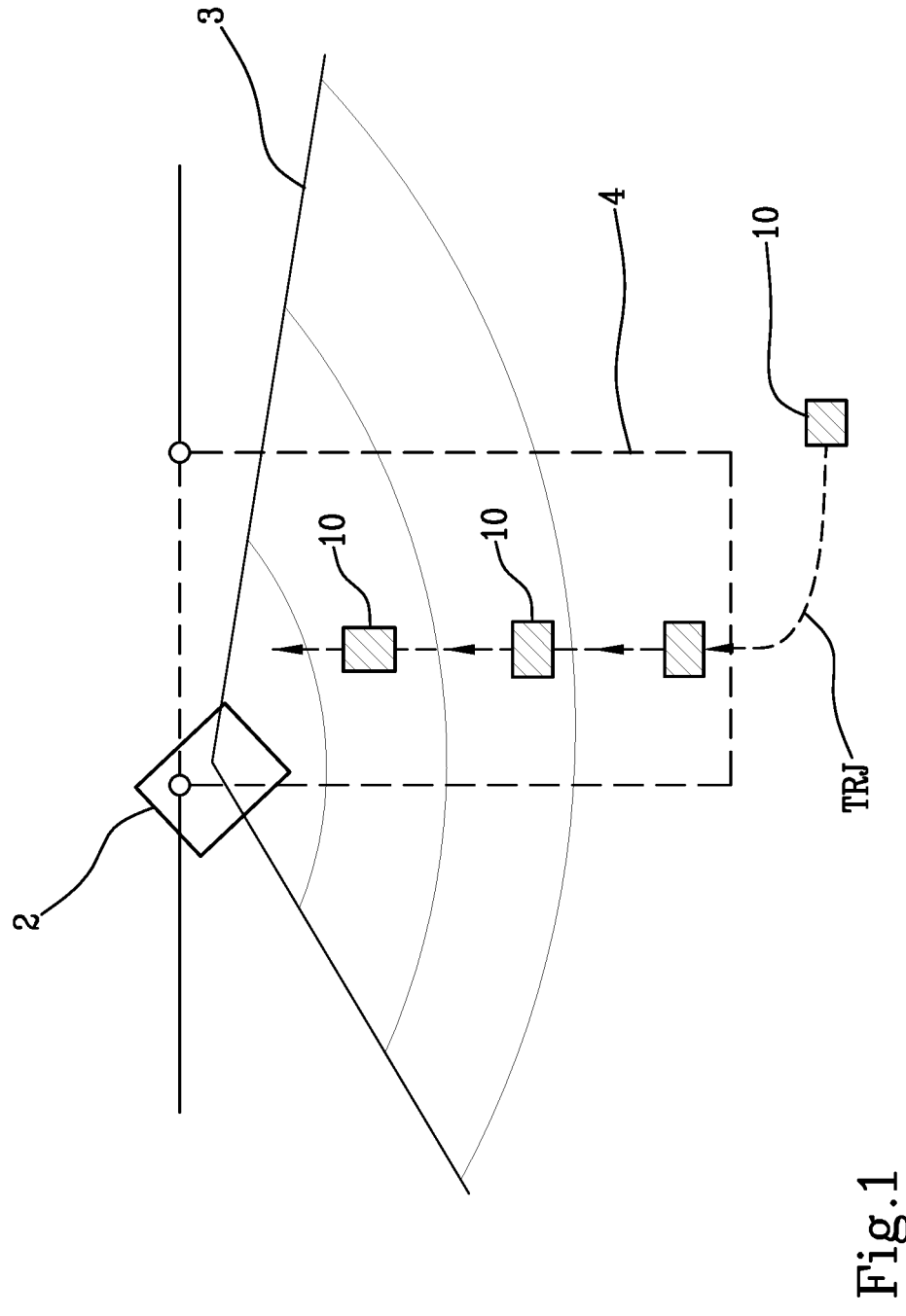
FIG. 1 illustrates an example of a system for monitoring the transit through a passage of a user or a land vehicle according to the invention.

It should be noted that in the description below, identical or similar blocks, components or modules, even if they appear in different embodiments of the invention, are indicated by the same numerical references in the figures.

In a first aspect of the invention, a device 2 for monitoring the transit of a user or of a land vehicle through a passage is provided.

The device 2 comprises a short-range radio signal receiver/transmitter 5 and a processing unit 20.

The short-range radio signal receiver/transmitter 5 is configured to transmit data indicative of a unique recognition code of the passage ID_2 and to receive data indicative of a confirmation of receipt of a unique recognition code ID_1 and indicative of an identifier of a user present inside the set cover angle 3;

The processing unit 20 is configured to:
  a) receive a first presence detecting signal S1 having a value that is indicative of the presence of the user and of the vehicle inside the set cover angle 3 and to generate, as a function of the value of the first presence detecting signal S1, a second signal S2 that carries data indicative of said unique recognition code ID_1;
  b) calculate, at set intervals of time ti, the distance di and the angle αi with respect to a fixed directrix associated to said set orientation of the device;
  c) determine the trajectory TRJ of the user or vehicle approaching the passage on the basis of a time sequence of calculated distances di and angles αi;
  d) if the trajectory TRJ is within the activation area 4 of the passage and approaches the passage, the processing unit 20 generates a command signal S3 to open the passage and enable the user or the land vehicle to pass through.

The determination of the positions of the user or of the land vehicle approaching the device/passage determined on the basis of the angle α and the distance d, allows having a precise position that can identify the trajectory TRJ with great reliability.

In general, it should be noted that in the present context and in the subsequent claims, the processing unit 20 is considered to be divided into distinct functional modules (memory modules or operating modules) for the sole purpose of describing the functionalities thereof clearly and completely.

Such processing unit can consist of a single electronic device, appropriately programmed to perform the functionalities described, and the different modules can correspond to hardware entities and/or routine software that are part of the programmed device.

Alternatively, or in addition, these functions can be performed by a plurality of electronic devices over which the aforesaid functional modules can be distributed.

The processing unit 20 can further make use of one or more processors for executing the instructions contained in the memory modules.

The processing unit 20 is further configured to calculate the position and determine the trajectory TRJ specified in points b) and c) when the user or the land vehicle is detected within the activation area 4.

Preferably, the processing unit 20 is configured to calculate the distance d and the angle α of the user or of the approaching land vehicle based on the method of the angle of arrival—AOA—.

The short-range radio signals are preferably UltraWideBand—UWB— signals or BluetoothLowEnergy—BLE— signals.

The cover angle 3 of the device 2 is comprised between 100° and 180°, preferably it is 120°.

Preferably, the device 2 is oriented with the cover angle 3 facing the centre of the passage, so that it completely covers the activation area 4 of the passage.

In a preferred embodiment of the invention, at least three devices 2 are present in the environment near the passage and the user or vehicle is located by Time difference Of Arrival—TdOA.

The short-range radio signal receiver-transmitter 5 is optionally also configured to:
  receive and forward data indicative of transit;
  receive and forward data indicative of a confirmation of receipt of transit data.

The processing unit 20 is further configured to receive a fourth signal S4 having a value indicative of data on the transit occurred through the passage.

In a second aspect of the invention, a system 1 for monitoring the transit of a user or of a land vehicle through a passage is provided.

The system 1 comprises one or more devices 2 as described above and a tag 10, associated with a user or a land vehicle, comprising a unique recognition code ID_1 and a receiver-transmitter of short-range radio signals that is able to exchange data with the short-range radio signal receiver-transmitter 5 of a device 2.

Figure 2:
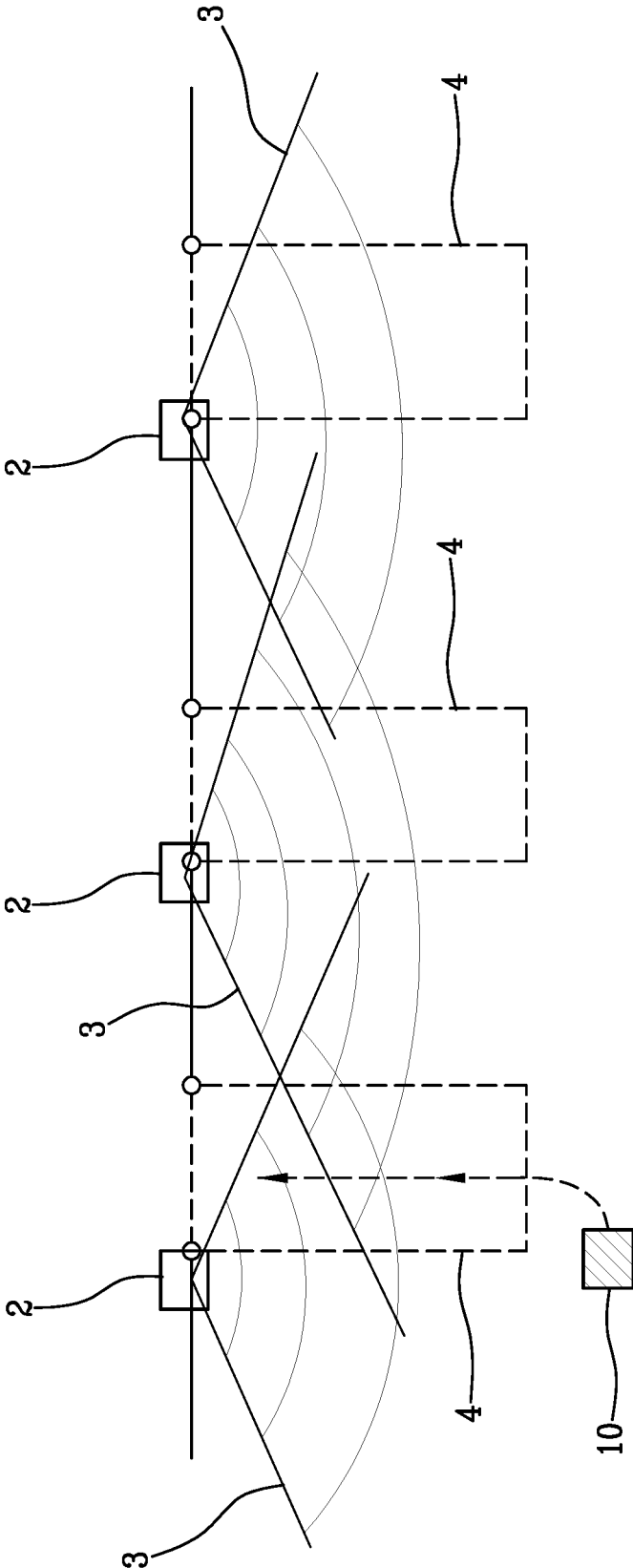
FIG. 2 shows a second example of a system for monitoring the transit through a plurality of passages by a user or a land vehicle.

As illustrated in the example of FIG. 2, the system 1 can comprise a plurality of passages, for example aligned, each comprising at least one device 2.

Figure 3:
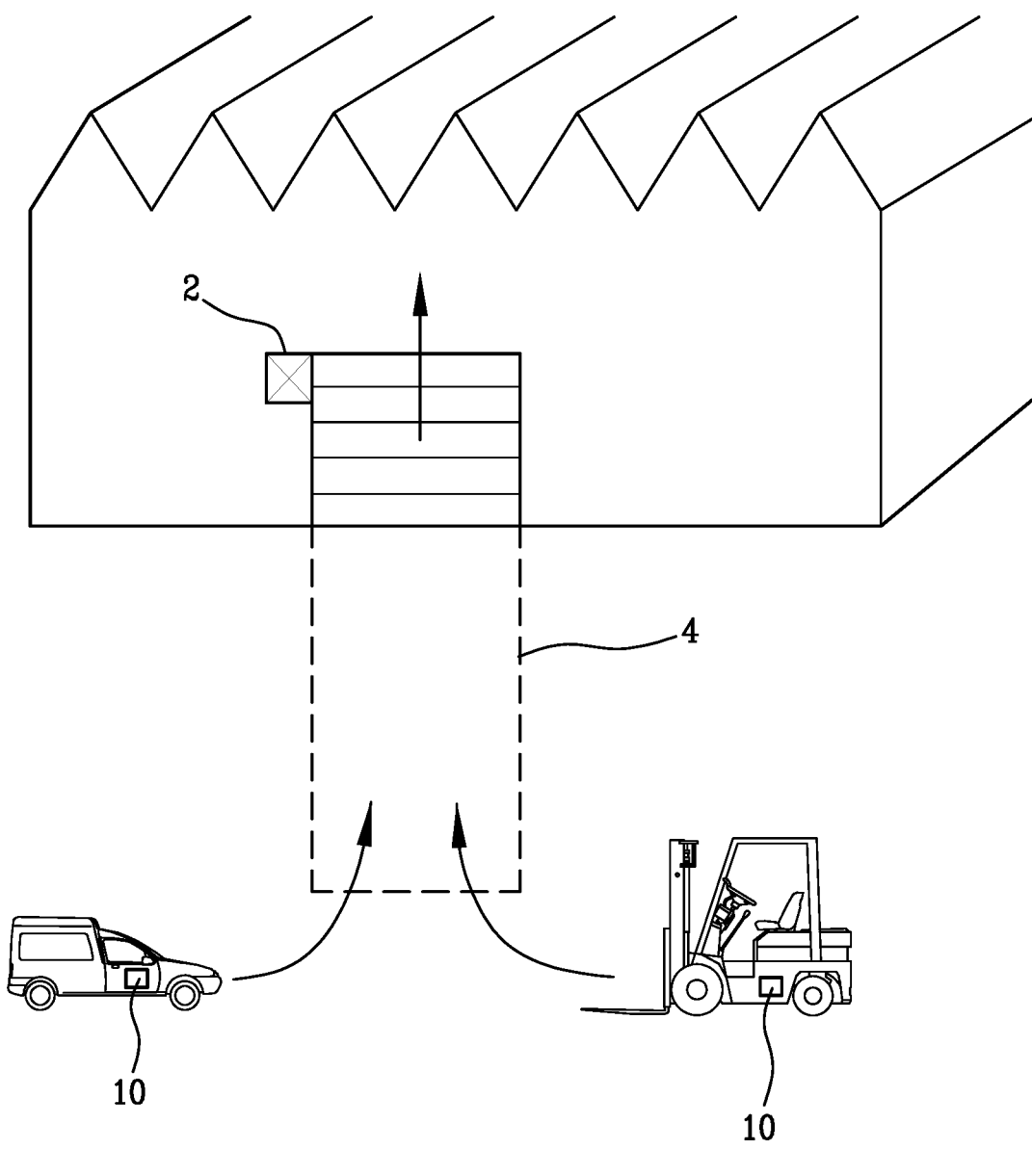
FIG. 3 shows a third exemplary embodiment of the system for monitoring the transit applied to the entrance to a shed.
Figures 4, 5A, 5B:
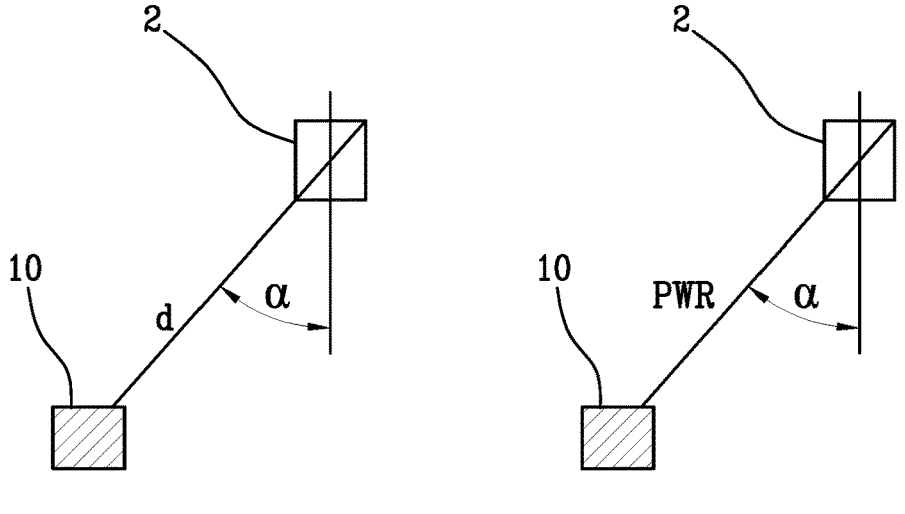
FIG. 4 shows a block diagram of the system for monitoring the transit according to the present invention.
FIGS. 5a and 5b show two ways of calculating the distance and the angle of a user near the device.

As illustrated in the example of FIG. 3, the system 1 can comprise a tag associated with a forklift or other land vehicle and the passage is a gate or a shutter of a shed or a factory.

Another form of application of the present invention provides a device 2 associated with a zone for taking over a package or other object and the tag 10 is associated with an operator who has to transit in the zone in which the package or object is present in order to pick it up. In this case, the system 1 is configured to emit a fifth confirmation signal S5 that the package or object has been picked up.

The data on the transit S4 occurred through a set passage are transmitted to a remote server 30, together with the date and time of transit through the passage.

These data also comprise the unique identification code of the passage ID_2 and the unique identification code of the tag 10 associated with a user or a specific land vehicle.

Non-limiting examples of passage types comprise at least:
  one passage to enter a train station, an underground station, an airport gate, a bus station and the like;
  one passage to enter a cinema, a theatre, a sports centre, a fun fair and the like;
  one passage to exit a car park or a petrol station.

Preferably, the data of the occurred transit S4 of a user or of a land vehicle through a passage are associated with a charge signal for a service provided.

For example, if a user after the entry into a first passage and the exit from a second passage, of two stations connected by a public transport means such as the underground or a train or a bus, the processing unit 20 is configured to send a payment charge signal for the path travelled.

Another "hands-free" payment application includes, for example, the payment for refuelling when the land vehicle passes through the exit passage from the petrol station.

In this case, the tag 10 is associated with a user refuelling his land vehicle and the system 1 comprises a sensor associated with the refuelling column, configured to send payment data relating to the refuelling just carried out.

As a person skilled in the art can easily understand, the invention allows overcoming the drawbacks highlighted above with reference to the prior art.

In particular, the present invention allows to accurately and reliably trace the trajectory of a user or a land vehicle approaching the passage. Furthermore, it allows an increase in safety in the transit of users or land vehicles through a passage.

It is clear that the specific features are described in relation to different embodiments of the invention with an exemplary and non-limiting intent. Obviously a person skilled in the art can make further modifications and variants to the present invention, in order to satisfy contingent and specific needs. For example, the technical features described in relation to an embodiment of the invention can be extrapolated therefrom and applied to other embodiments of the invention. Such modifications and variations are moreover embraced within the scope of the invention as defined by the following claims.

The invention claimed is:

1. A device for monitoring the transit of a user or of a land vehicle through a passage,
   the device being installed near the passage with a set orientation and having a set cover angle, the device comprising:
      a receiver-transmitter of short-range radio signals configured to:
      transmit data indicative of a unique recognition code of the passage (ID_2) at predetermined intervals;
      receive data (ID_1) indicative of a confirmation of receipt of the unique recognition code (ID_2) and indicative of an identifier of a user present inside the set cover angle at predetermined intervals;
      a processing unit configured to:
   a) receive a first presence detecting signal (S1) having a value that is indicative of the presence of the user and of the vehicle inside the set cover angle;
   b) calculate, at predetermined time intervals (ti), a distance (di) and an angle (αi) with respect to a fixed directrix of said set orientation of the device;
   c) determine the trajectory (TRJ) of the user or vehicle approaching the passage on the basis of a time sequence of calculated distances (di) and angles (αi);
   d) if said trajectory (TRJ) is within the activation area of the passage and approaches the passage, generate a command signal (S3) to open the passage and enable the user or the land vehicle to pass through.

2. The device according to claim 1, wherein said processing unit is further configured to calculate the position and determine the trajectory (TRJ) specified in points b) and c) when the user or the land vehicle is detected within the activation area.

3. The device according to one or more of the preceding claim 2, wherein said processing unit is configured to calculate the distance (d) and the angle (α) on the basis of the arrival angle method AOA.

4. The device according to one or more of the preceding claim 3, wherein said short-range radio signals are Ultra-WideBand UWB signals or BluetoothLowEnergy BLE signals.

5. The device according to one or more of the preceding claim 4, wherein the cover angle of the device is comprised between 100° and 180°, preferably 120°.

6. The device according to one or more of the preceding claim 5, wherein the device is oriented with the cover angle facing the centre of the passage.

7. The device according to one or more of the preceding claim 6, wherein in the environment near the passage at least three devices are present and the user and the vehicle is located by Time difference Of Arrival—TdOA.

8. The device according to one or more of the preceding claim 7, wherein the receiver-transmitter of short-range radio signals is configured to:
   receive and forward data indicative of transit;
   receive and forward data indicative of a confirmation of receipt of transit data.

9. The device according to one or more of the preceding claim 8, wherein the processing unit is further configured to:
   receive a fourth signal (S4) having a value indicative of data on the transit occurred through the passage.

10. A system for monitoring the transit of a user or of a land vehicle through a passage, comprising:
   one or more devices according to claims 9;
   a tag, associated with a user or a land vehicle, comprising a unique recognition code (ID_1) and a receiver-transmitter of short-range radio signals that is able to exchange data with the receiver-transmitter of short-range radio signals of a device.

11. The system according to claim 8, wherein a plurality of passages is present, each comprising at least one device.

12. The system according to claim 10 or 11, wherein the tag is associated with a forklift truck and the passage is a gate or a shutter.

13. The system according to claim 10 or 11, wherein the device is associated with a zone for taking over a package or other object and the tag is associated with an operator who has to transit in the zone in which the package or object to be picked up is present, the system being configured to emit a confirmation signal (S5) that the package or object has been picked up.

14. The system according to claim 10, wherein data on the transit (S4) occurred through a set passage are transmitted to a remote server, together with the date and time of transit through the passage.

15. The system according to claim 14, wherein said passage is comprised between at least:
   one passage to enter a train, underground station, an airport gate, a bus station;
   one passage to enter a cinema, a theatre, a sports centre, a fun fair;
   one passage to exit a car park or a petrol station.

16. The system according to claim 15, wherein after the entry into a first passage and the exit from a second passage, the processing unit sends a payment charge signal for the path or the service provided.

* * * * *